No. 753,106. Patented February 23, 1904.

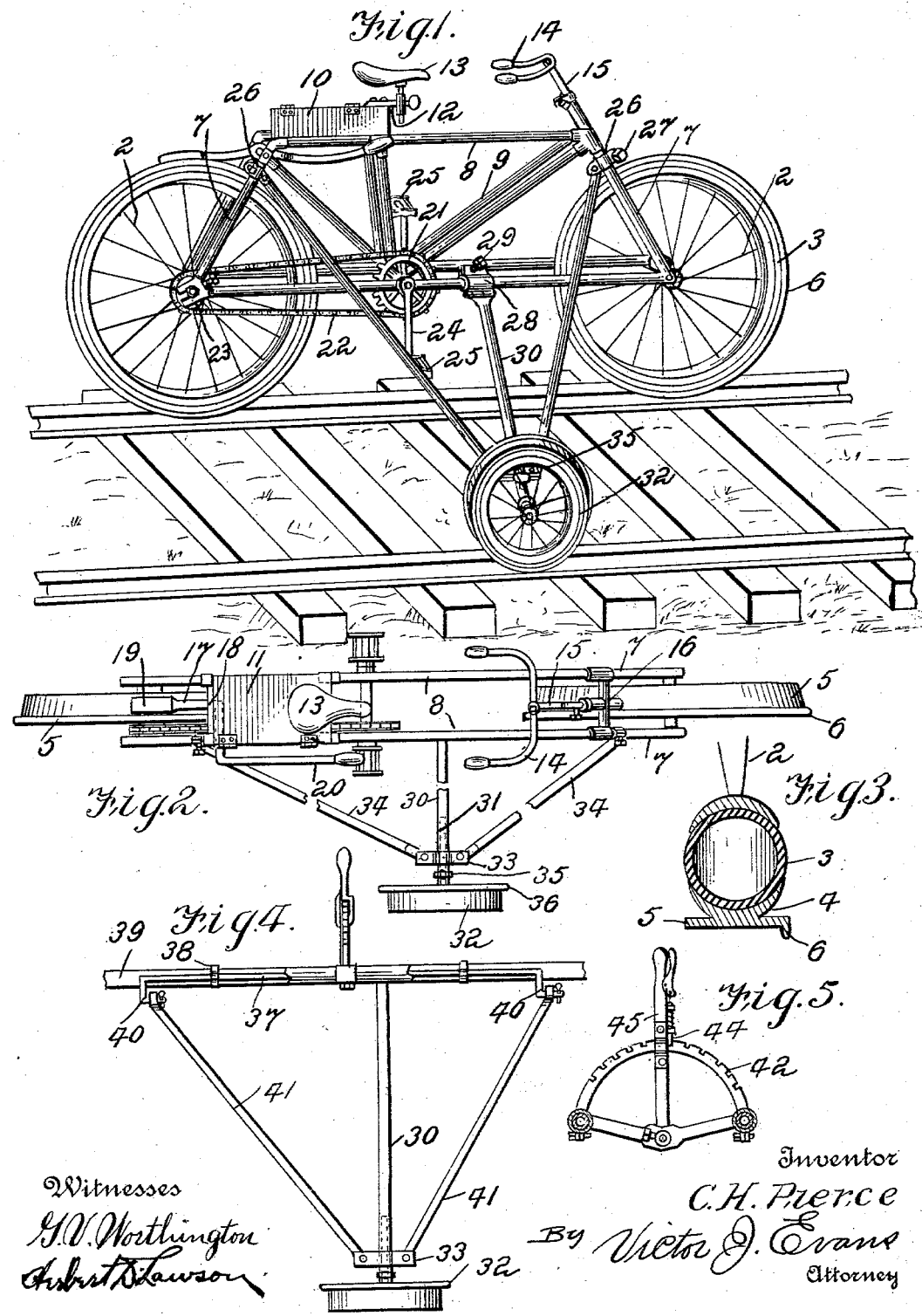

UNITED STATES PATENT OFFICE.

CHARLES H. PIERCE, OF ALMA, CALIFORNIA.

RAILWAY-VELOCIPEDE.

SPECIFICATION forming part of Letters Patent No. 753,106, dated February 23, 1904.

Application filed June 20, 1903. Serial No. 162,411. (No model.)

*To all whom it may concern:*

Be it known that I, CHARLES H. PIERCE, a citizen of the United States, residing at Alma, in the county of Santa Clara and State of California, have invented new and useful Improvements in Railway-Velocipedes, of which the following is a specification.

My invention relates to new and useful improvements in railway-velocipedes; and its object is to provide a light, durable, and inexpensive device of this character especially adapted for use by track-walkers, section-foremen, road-masters, &c.

A further object is to provide means whereby the angle of the velocipede to the track may be regulated to adapt the device to differently-inclined portions of the track.

With the above and other objects in view the invention consists in the novel construction and combination of parts hereinafter more fully described and claimed, and illustrated in the accompanying drawings, showing the preferred form of my invention, and in which—

Figure 1 is a perspective view of the velocipede. Fig. 2 is a plan view thereof, the laterally-extending rod being broken away. Fig. 3 is an enlarged section through one tire of the velocipede. Fig. 4 is a plan view, partly broken away and showing a modified attachment for the velocipede; and Fig. 5 is an end elevation of the adjusting means for said modification.

Referring to the figures by numerals of reference, 1 1 are parallel rods of a frame, between the ends of which are mounted wheels 2 having pneumatic tires 3. Fitted over each tire is a ring 4, having its inner face concaved in cross-section, the greatest internal diameter of said ring being slightly less than the external diameter of the tire when inflated. The ring 4 has laterally-extending flanges 5 at the central portion thereof which form a tread, and one of these flanges is provided with an outwardly-extending rib 6. Inwardly-inclined parallel rods 7 extend from the ends of rods 1 and are connected at their upper ends by parallel horizontal rods 8. Suitable truss-rods 9 are located between the rods 1, 7, and 8. A tool-box or other receptacle 10 is located on the rods 8, at the rear ends thereof, and a hinged lid 11 is provided with a forwardly-extending arm 12, upon which is adjustably mounted a saddle 13 of any suitable form. Handle-bars 14 are connected to a vertically-adjustable rod 15, arranged upon a cross-bar 16, which connects the front inclined rods 7. An L-shaped lever 17 is journaled upon a cross-bar 18, secured between the rear inclined rods 7, and one end of this lever has a brake-shoe 19, which is adapted to bear upon the tread of the rear tire of the device. A handle 20 extends forward from the lever 17 at one side of the frame of the velocipede and within easy reach of a person occupying the saddle 13. A sprocket 21 is arranged adjacent the center of the rods 1 and serves to drive a chain 22, which extends over a sprocket 23, secured to the hub of the rear wheel 2. Sprocket 21 is adapted to be driven by means of cranks 24, having pedals 25.

Clamps 26 are adjustably mounted upon one of the rods 7 at each end of the velocipede, and these clamps are adapted to be secured in adjusted position by means of set-screws 27. A clamp 28 is also secured to one of the rods 1 and is adapted to be fastened in adjustable position by means of a set-screw 29. To this clamp 28 is hinged a rod 30, into the hollow end of which projects a stem 31, extending from the center of a wheel 32. Ears 33 project laterally from the end of rod 30, and rods 34 are pivoted at opposite ends to these ears and to the clamps 26. A set-screw 35 is arranged within the tubular end of rod 30 for the purpose of securing the stem 31 in adjusted position therein.

It will be understood that the velocipede herein described is propelled by a person seated on the saddle 13 and operating pedals 25. The ribs 6 on the tires of the two wheels 2 and the flange 36 of the small wheel 32 serve to hold the velocipede upon the track during the movement of the same thereover. By adjusting the clamps 26 vertically upon their rods 7 the rod 3 can be swung upward or downward, as desired, so as to produce the desired incline of the frame of the velocipede to the track, so as to prevent the same from tilting when in use.

In Figs. 4 and 5 I have shown a modified form of attachment for the frame by means of which the incline of the velocipede to the track may be regulated by the operator without stopping the machine. This modification is especially desirable for use where there are a number of curves to the track and where the pitch of the track necessarily varies. This modified attachment comprises a rod 37, which is journaled within brackets 38, secured to a cross-strip 39, which may be fastened in any suitable manner to the end rods 7. L-shaped arms 40 project from the ends of rods 37 and project into the ends of rods 41 similar to the rods 34, hereinbefore referred to. A toothed segment 42, as shown in Fig. 5, is suitably mounted on top of the frame of the velocipede, and a lever 43 extends from rod 37 and is provided with a spring-pressed pulley 44, which is adapted to normally engage one of the teeth of the segment. It will be understood that the operator can by reaching down and grasping lever 43 swing rod 37, so as to draw the rods 41 inward or press them outward, as desired, thereby regulating the incline of the velocipede to the track. For this reason the vehicle when approaching a curve will not be in danger of tilting, as the person operating the same can readily adjust its incline in proportion to the pitch of the track. By employing a tread for the wheels 2 such as hereinbefore described the resiliency of a pneumatic tire is retained and at the same time the displacement of the wheels from the rails is prevented. The treads of these wheels are placed in position by first removing the air from the tires, then placing the rings thereround, and finally inflating the tires, so as to expand them into the grooved inner faces of the rings.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a railway-velocipede, the combination with a frame, and wheels journaled in the ends thereof; of a longitudinally-extending rod journaled at one side of the frame, arms at the ends of the rod, a rod hinged to the frame, a wheel journaled at the end of said rod and adapted to bear upon a rail, rods pivoted to the arms and to said hinged rod, and means for rotating the longitudinally-extending rod.

2. In a railway-velocipede, the combination with a frame having wheels journaled in the ends thereof, and means for propelling the wheels; of a rod journaled on one side of the frame, arms extending from the ends of said rod, a rod hinged to the frame, a stem adjustably secured in one end thereof, a wheel journaled upon the stem, ears extending from the hinged rod, rods pivoted to the ears and the arms, and means for rotating the arms and other rod.

3. In a railway-velocipede, the combination with a frame having wheels journaled therein, and means for propelling the wheels; of a revoluble rod journaled upon the frame, means for rotating the rod, arms to the rod, a rod hinged to the frame, a stem adjustably mounted in one end thereof, a wheel journaled upon the stem, and rods pivoted at opposite ends to the arms and the rod of the stem, respectively.

In testimony whereof I affix my signature in presence of two witnesses.

CHARLES H. PIERCE.

Witnesses:
R. F. ROBERTSON,
J. A. TUDOR.